Feb. 7, 1956 R. C. SCHERER 2,733,939
COMPRESSED PACKING FOR CABLE THROUGH WALL
Filed Sept. 4, 1952
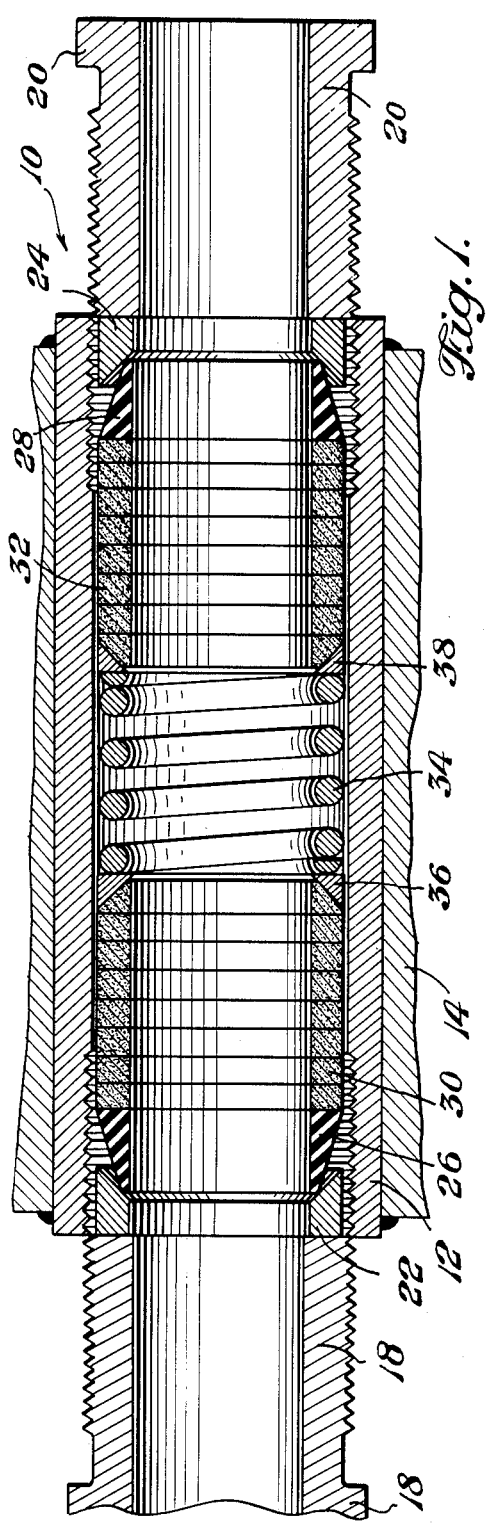
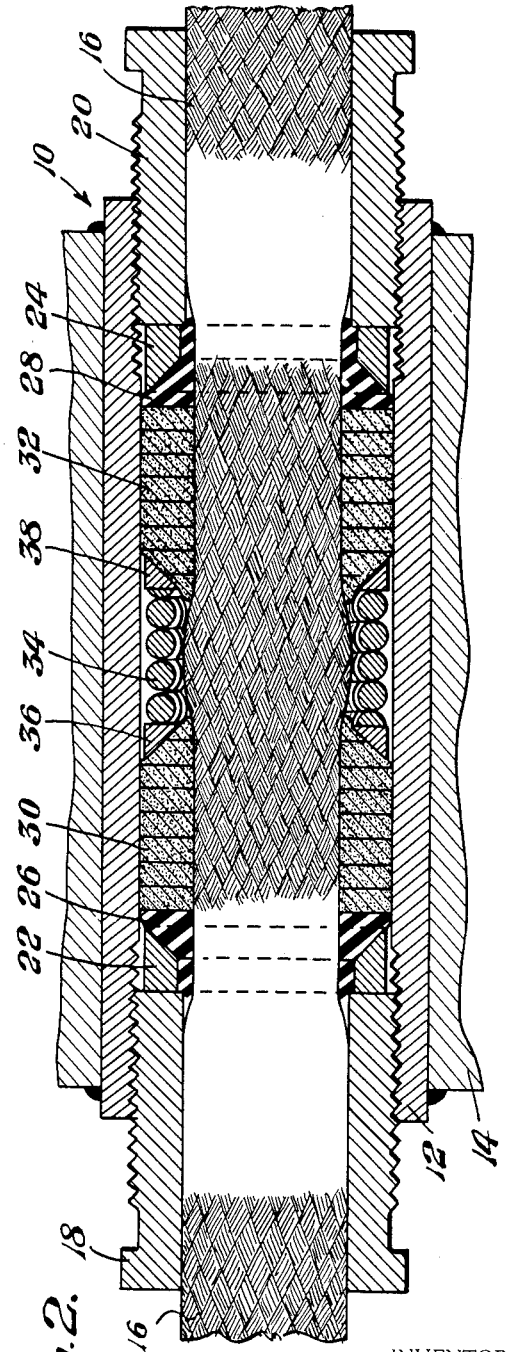
INVENTOR
Robert C. Scherer,
BY Karl W. Flocks
ATTORNEY

United States Patent Office 2,733,939
Patented Feb. 7, 1956

2,733,939

COMPRESSED PACKING FOR CABLE THROUGH WALL

Robert C. Scherer, Baltimore, Md.

Application September 4, 1952, Serial No. 307,780

2 Claims. (Cl. 285—30)

The present invention relates to packing assemblies. More particularly, the present invention relates to a packing assembly for use with a stuffing tube. In the design of marine vessels and particularly submarines, the vessel is constructed with separate compartments, each compartment independent of another with the view that in the event of damage to the submarine, the damaged compartment may be completely isolated from the remainder of the vessel. Not only must the walls or bulkheads of each compartment be completely water-tight, but it is necessary that the electrical cables extending from one compartment to another through the bulkheads be effectively sealed. In order to seal an electrical cable in a bulkhead, a stuffing tube is inserted into an opening in the bulkhead and welded or secured therein by some suitable means. The cable is then inserted into the stuffing tube and a seal is effected between the cable and the stuffing tube. Prior to the instant invention, various types of stuffing tube seals have been employed, but it has been discovered that none of these heretofore known sealing arrangements effectively sealed the stuffing tube for an extended period of time.

One packing assembly heretofore utilized consisted of a stuffing tube which was adapted to receive a two-part resin base compound which was injected around the cable. However, before the compound could be injected into the stuffing tube, the tube had to be thoroughly cleaned with a caustic solution. The caustic solution not only exposed personnel to danger of burns, but it had to be very thoroughly removed, or it interfered with the setting of the resin compound. Moreover, the cable itself had to be cleaned to insure that the compound would adhere thereto. Aside from the fact that this cleaning procedure consumed many valuable hours, the protective aluminum coating on the cable was oftentimes removed by the caustic cleaning solution thereby exposing the sealing compound to the internal cable temperatures generated by the electrical current passing through the cable. Due to the internal cable temperatures, the compound had a tendency to relax, which loosened the seal. As a result, it became necessary to adjust the packing assembly at periodic intervals in order to prevent any possible leakage through the stuffing tube and eventually the bulkhead. Furthermore, the resin compound, once it had set, was difficult to remove and if it were necessary to remove the cable from the stuffing tube, the resin had to be picked and drilled out.

It is an object of the present invention to provide a packing assembly for a stuffing tube that is simple to install and requires but an initial adjustment, thereby obviating periodic adjustment after installation.

It is another object of the present invention to provide a packing assembly for a stuffing tube in which the packing assembly can be adjusted from either side of the stuffing tube.

Still another object of the present invention is to provide a packing assembly for a cable stuffing tube whereby a compression spring is utilized to continuously seal the cable in the stuffing tube.

Other objects and the nature and advantages of the instant invention will be apparent from the following description taken in conjunction with the accompanying drawings, wherein:

Fig. 1 is a vertical sectional view of the packing assembly embodied in the present invention showing the packing elements prior to their adjustment in the stuffing tube; and Fig. 2 is a vertical sectional view of the packing assembly shown in Fig. 1 with the packing elements in the sealing position.

Referring now to the drawings, and particularly Fig. 1, the packing assembly embodied in the present invention is generally indicated at 10 and includes a stuffing tube 12 extending through a bulkhead 14, shown partially, the bulkhead 14 forming the wall between the compartments of a marine vessel. The stuffing tube 12 is welded or secured in the bulkhead 14 in a water-tight manner and is provided with internal threads at both ends thereof. An electrical cable 16, which may be constructed with an outside woven wire sheath extends through the tube 12 and is adapted to convey electrical current from one compartment to the adjacent compartment. Threadedly engaging the stuffing tube 12 at both ends thereof and encircling the cable 16 are gland nuts 18 and 20 which are adapted to initially adjust the internal packing, as will hereinafter be described.

Metal rings 22 and 24 contact the inner face of the gland nuts 18, 20, respectively, and are provided with bevelled faces formed on the side facing the inside of the stuffing tube 12. The bevelled faces of the metal rings 22, 24 engage bevelled rubber rings 26, 28, respectively, and are adapted to force the rubber rings 26, 28 into sealing engagement with the cable 16. Positioned around the cable 16 and abutting against the inside face of the rubber rings 26, 28, respectively, are prefabricated packing sets 30, 32. The packing sets are shown formed in a series of disc-like members which are adapted to be compressed into sealing engagement around the cable 16. A compression spring 34 is positioned between the prefabricated packing sets 30, 32 and is adapted to continuously exert pressure on the packing sets, thereby obviating any further adjustment of the packing assembly after the initial adjustment is accomplished. Bevelled metal rings 36, 38 are provided between the compression spring 34 and the packing sets 30, 32 forming backing plates for the spring 34 and also directing the inner discs of the packing sets 30, 32 toward the cable 16 in sealing engagement therewith.

Fig. 1 illustrates the packing assembly prior to tightening the gland nuts 18, 20 in position in the stuffing tube 12. Referring now to Fig. 2, the packing assembly is shown in the sealing position in the stuffing tube 12, with the gland nuts in the tightened position. As the gland nuts 18, 20 are threaded into the stuffing tube 12, they force the metal rings 22, 24 inwardly and against the action of the spring 34. As the metal rings 22, 24 move inwardly, the rubber rings 26, 28 are forced into contact with the cable 16, thereby compressing the cable, as shown in Fig. 2. The rubber rings 26, 28 further act to prevent extrusion of the packing sets 30, 32 past the metal rings 22, 24 when the gland nuts 18, 20 are tightened. The disc members of the packing sets 30, 32 are also compressed by the tightening of the gland nuts 18, 20 and are thereby forced against the cable 16 to compress the cable and form a tight seal therearound. As shown in Fig. 2, the inner disc member of each packing set is forced against the cable 16 by the metal rings 36, 38 and thereby acts to further seal the cable at the interior of the stuffing tube 12. As the gland nuts 18, 20 are moved inwardly, the spring 34 supplies a continuous force against the packing sets 30, 32 to insure a positive seal of the packing members at all times.

Referring again to Fig. 2, the cable 16 is shown bulging slightly at the point where the spring 34 is positioned. This is due to the lack of any pressure on the cable at that point and to the continuous pressure of the packing sets 30, 32 immediately adjacent the spring 34.

The installation of the packing assembly is accomplished by initially threading the gland nuts 18, 20 into the ends of the stuffing tube 12 on both sides of the bulkhead 14, thereby compressing the spring 34.

In operation, should the cable become soft due to the electrical current passing therethrough, any tendency of the packing sets to relax, thereby loosening the seal, is overcome by the compression spring 34 which continuously forces the packing sets outwardly. It is apparent then that once the gland nuts 18, 20 have been adjusted on both sides of the bulkhead 14, no further adjustment is necessary and a constant seal around the cable 14 will, at all times, be maintained. There need be no retightening of the gland nuts 18, 20 after the initial setting and the greater the pressure exerted at either end of the stuffing tube 14, the greater is the resistance of the packing assembly to leakage.

From the foregoing, it is apparent that the present invention presents a packing assembly for cable stuffing tubes that is simple to install and, after installation, requires no maintenance. The seal is effective and constant. The stuffing tube need not be cleaned before the cable is inserted into the stuffing tube and the use of a resin compound is obviated. The installation operation can be accomplished with relatively little difficulty and the only adjustment necessary is the initial tightening of the gland nuts 18, 20.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a packing assembly, a stuffing tube being internally threaded at both ends thereof, a stationary cable positioned in said tube, a pair of gland nuts each of which threadedly engages said tube at one end thereof and surrounds said cable, a pair of metal rings, the outer edge of each metal ring engaging a gland nut and the inner edge thereof having a bevelled inner face, a pair of rubber rings positioned in said stuffing tube adjacent said metal rings, each of said rubber rings having a bevelled face engaging the bevelled face of a metal ring, a pair of packing sets positioned around said cable, one edge of each of said packing sets abutting against a rubber ring, a second pair of metal rings positioned in said stuffing tube around said stationary cable, each of said last-named metal rings engaging a packing set at the inner end thereof, and a spring positioned around said cable and abutting against said last-named metal rings, said spring cooperating with said gland nuts for forcing said packing sets and rubber rings against said cable to compress said cable in said stuffing tube and thereby seal said cable therein.

2. In a packing assembly, a stuffing tube having a stationary cable positioned therein, a pair of annular members secured in said tube at the ends thereof and surrounding said cable, a pair of metal rings, the outer edge of each of said metal rings engaging an annular member and the inner edges thereof having a bevelled inner face, a pair of rubber rings positioned in said stuffing tube adjacent said metal rings, each of said rubber rings having a bevelled face engaging the bevelled face of a metal ring, a pair of packing sets positioned around said cable, one edge of each of said packing sets abutting against a rubber ring, a second pair of metal rings positioned in said stuffing tube around said stationary cable, each of said last-named metal rings engaging a packing set at the inner end thereof, and a spring positioned around said cable and abutting against said last-named metal rings, said spring cooperating with said angular members for forcing said packing sets and rubber rings against said cable to compress said cable in said stuffing tube and thereby seal said cable therein.

References Cited in the file of this patent

UNITED STATES PATENTS

| 735,364 | Gold | Aug. 4, 1903 |
| 827,803 | Jerou | Aug. 7, 1906 |
| 1,391,396 | McMurtie | Sept. 20, 1921 |
| 1,755,436 | Faudi | Apr. 22, 1930 |
| 1,805,155 | Weeks | May 12, 1931 |
| 2,111,200 | Amourelle | Mar. 15, 1938 |
| 2,272,222 | Mullen | Feb. 10, 1942 |
| 2,504,936 | Payne | Apr. 18, 1950 |

FOREIGN PATENTS

| 8,268 | Great Britain | of 1895 |